March 21, 1967 R. F. EGNER 3,310,025
AUTOMOBILE MILEAGE REMINDER METER
Filed June 14, 1966
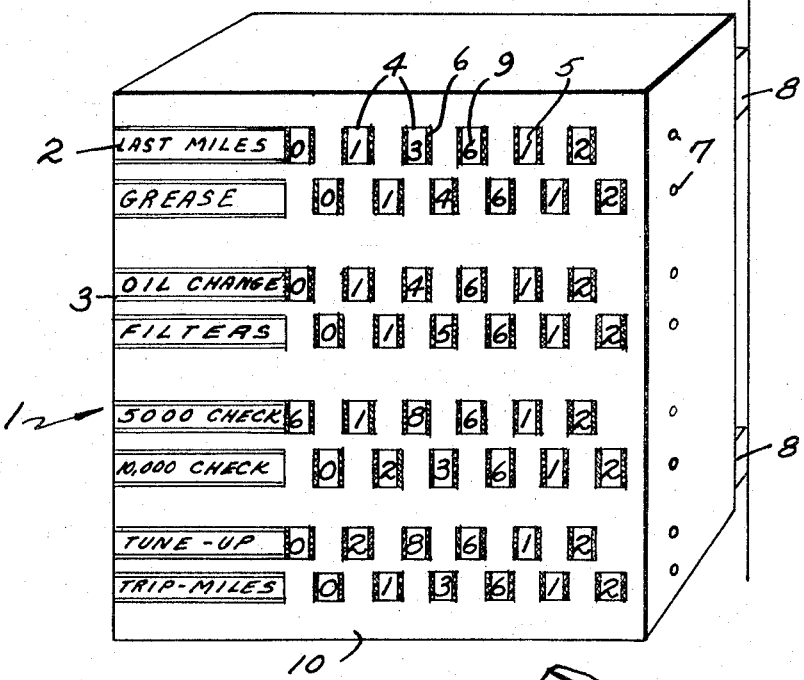
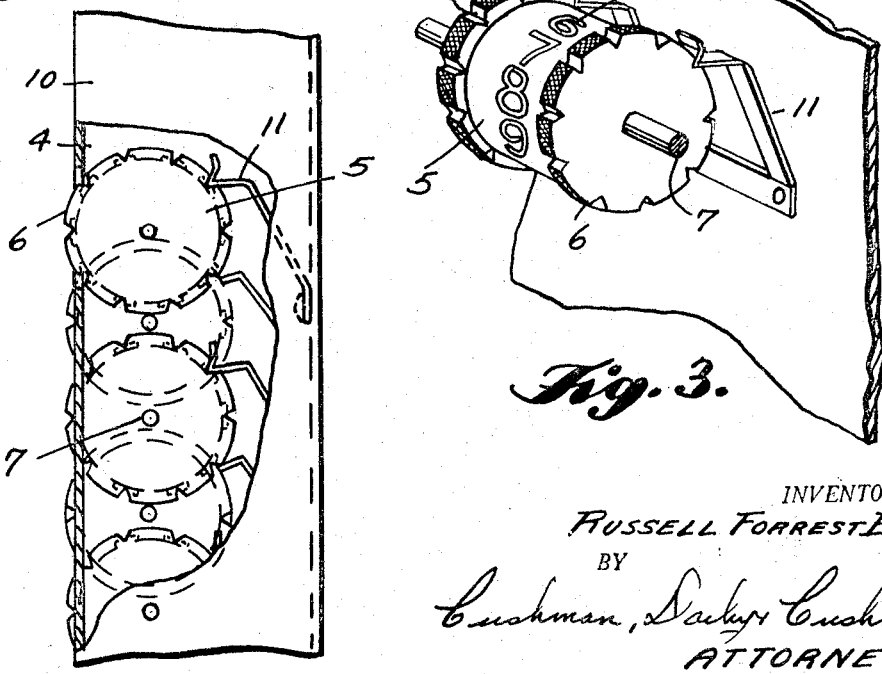
INVENTOR.
RUSSELL FORREST EGNER
BY
Cushman, Darby & Cushman
ATTORNEYS

United States Patent Office 3,310,025
Patented Mar. 21, 1967

3,310,025
AUTOMOBILE MILEAGE REMINDER METER
Russell F. Egner, 621 Sheridan St.,
Chillum, Md. 20783
Filed June 14, 1966, Ser. No. 557,553
2 Claims. (Cl. 116—133)

The present invention is directed to an automobile mileage reminder meter, and more particularly the present invention is directed to a device for indicating the automobile mileage whereat certain maintenance functions, i.e., greasing oil filter changing, etc. should be performed, wherein the device is much more compact and reliable than the devices of the prior art.

The prior art

The prior art has used various indicating devices for indicating the times at which the car should be serviced. These devices are generally designed to be fastened on the dash or instrument panel of an automobile, preferably near the speedometer, and contain a plurality of indicia wheels arranged so that the indicia on the wheels may be selected and positioned in registry with a corresponding plurality of windows. The indicia shown through the windows may illustrate, for example, the mileage figures at which the automobile should be lubricated and the oil changed. Such device should be small and of light weight, and may be mounted on the automobile by vacuum cups or by magnets. Examples of such prior art devices will be found in the patents issued to McClellan et al., No. 1,651,033, and Herster, No. 3,169,331.

One of the problems with the prior art automobile mileage indicating devices has been that the devices are relatively bulky and not as compact as desired.

Objects of this invention

It is an object of this invention to provide an improved, compact automobile mileage indicating device.

It is another object of this invention to provide a device with a plurality of shafts, each shaft carrying a plurality of indicia carrying wheels, wherein the indicia are so arranged to be in register with windows in the device, wherein the device is of much more compact structure than previous devices and the desired automobile mileage may be easily set in said device.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes or modifications within the scope of the invention will become apparent to those skilled in the art from this detailed description.

Summary of the invention

The automobile mileage reminder meter of the present invention uses a plurality of staggered cylinders on a plurality of shafts to indicate the desired automobile mileage. The case of the device contains flanged receiving slots which will hold title cards. Each title card receiving slot is located opposite a plurality of windows in the case. An indicia carrying cylinder is in register with each window and a portion of the cylinder slightly protrudes therethrough. The protruding portion of the cylinder is serrated or roughened to allow easy turning, for example, by means of a finger or thumb. Each cylinder is controlled by a spring detent to hold the desired indicia in register. The cylinders of two adjacent rows are alternatingly staggered from one another, thereby allowing the indicating device of the present invention to be much more compact than devices of the prior art.

Description of the invention

The automobile mileage indicating device of this invention will be more readily understood with reference to the accompanying drawings, wherein:

FIGURE 1 represents a frontal view of the automobile mileage indicating device of this invention;

FIGURE 2 represents an enlarged partial cross-sectional view of the device of FIGURE 1; and FIGURE 3 represents an enlarged view of a single cylinder, shown mounted on a shaft and in engagement with a spring detent.

In FIGURE 1, the automobile mileage indicating device 1 is shown with a plurality of title cards 2 inserted in the respective flanged receiving slots 3 in the case 10. Opposite each title card 2 is a plurality of windows 4, each window having mounted therein an indicia carrying cylinder 5. Protruding through each window is a knurled, enlarged section 6 of the cylinder 5. Mounted on the surface of cylinder 5, and visible through window 4, are indicia 9, for example, a series of integers. Each plurality of cylinders opposite each title card is mounted on one of a plurality of shafts 7. The device 1 has attached to its back a magnet or a plurality of magnets 8 for mounting upon an automobile dash.

As FIGURE 1 illustrates, the indicia carrying cylinders 5 of adjacent shafts 7 are alternatingly staggered relative to one another. This staggered arrangement allows the device of this invention to be much more compact than indicating devices previously known to the art. That is, the automobile mileage indicating device of this invention is only about one-half the height of the indicating devices of the prior art. Thus, numerous automobile maintenance functions may be included on one compact indicating device of the present invention.

FIGURE 2 is an enlarged, partial cross section of the automobile mileage indicating device of FIGURE 1. A plurality of shafts 7 carry a plurality of indicia carrying cylinders 5. Knurled sections 6 protrude through the windows 4. The cylinders are held in certain predetermined register with the windows 4 of case 10 by means of spring detent 11, which is fastened to the rear of case 10.

FIGURE 3 represents an enlarged 3-dimensional view of a single cylinder 5, shown mounted on shaft 7 and in engagement with spring detent 11. The cylinder 5 has two knurled, enlarged sections 6 which contain, upon the outer surface thereof, knurling and a series of slots, or notches 12. Each notch 12 is so positioned as to maintain different indices in visual register with the window 4 with the case 10. The enlarged section 6 outer knurled surface protrudes through window 4 so that the cylinder may be rotated by a thumb or finger.

The spring detent means may be a single spring, acting upon one knurled and notched section 6, or may be a pair of spring detents, for example, as shown in FIGURE 3, which engage both enlarged knurled sections 6.

The main indicia portion of cylinder 5 is shown in FIGURE 3 with a series of integers 9 mounted thereupon. While the indicating device of this invention may be used to record desired information in a number of differing uses, the preferred usage is, as previously mentioned, for indicating the automobile mileage whereat certain maintenance functions should be performed. Accordingly, the preferred embodiment of this invention will carry the numerals zero to nine inclusive mounted upon the cylinder.

The case 10 and the wheels or cylinders 5 of the automobile mileage indicating device of this invention may be of metal, for instance, steel or aluminum, or of plastic, for instance, polystyrene or polypropylene or an acrylic plastic. If a plastic is used, it is preferably dyed or of an opaque or translucent nature so that the interior of the case 10 will not be visible.

The spring detent 11 is preferably of spring steel and is fastened to case 10, for example, by welding, riveting, or bolting.

The case 10 may be mounted on an automobile dash or other surface by a wide variety of holding means, i.e., magnets, suction cups, etc., or may be built into the car dash during or after the manufacture of the car.

When referring to "staggered," the present invention refers to an indicating device with a plurality of shafts mounted in essentially one plane, each shaft carrying a plurality of wheels or cylinders, and wherein the wheels of any two adjacent shafts overlap each other that is, each wheel on a shaft is substantially overlapped by at least one wheel, and generally two wheels, of the adjacent shaft.

It will be readily seen that the automobile mileage reminder meter of this invention is a practical device which is suitable for manufacturing at low cost, thereby allowing the production of a needed article for which mass production has been previously prevented because of the relatively high production cost per unit of the devices of the prior art, which tend to be overcomplicated and impracticable; whereas the much simpler device of this invention will be within a price range such that the majority of the motoring public may enjoy the benefits thereof.

What is claimed is:

1. An automobile mileage reminder meter comprising:
    a housing;
    a plurality of shafts disposed in said housing with their axes in spaced, generally parallel relationship;
    a plurality of indicia cylinders mounted for individual rotation on each of said shafts at spaced points along the shaft length,
        the spacing between adjacent shafts being less than the diameter of the cylinders mounted thereon,
        the cylinders on each shaft being arranged in staggered alternating relation with the cylinders on each adjacent shaft so that the cylinders on one shaft overlap with the cylinders on adjacent shafts,
        each of said cylinders carrying a plurality of indicia around its peripheral surface;
    a plurality of windows in said housing corresponding to the plurality of cylinders,
        each window exposing one of the indicia on the peripheral surface of the corresponding cylinder;
    wheel means integral with each cylinder accessible through the corresponding window for individually rotating the cylinder to change the visible indicia;
    a plurality of detent-engaging surfaces provided at spaced points around the periphery of each wheel means in general correspondence to the indicia thereon; and
    a spring-biased detent for each cylinder affixed to said housing for engagement with said surfaces of said cylinder one at a time to releasably hold said cylinder against rotation with a selected indicia visible through the window corresponding thereto.

2. The reminder meter of claim 1 including a wheel means at each end of each said cylinder, each said wheel means being notched at spaced points around its periphery to form said detent-engaging surfaces, the remainder of the peripheral surface of each wheel means being knurled to facilitate manual engagement thereof.

References Cited by the Examiner

UNITED STATES PATENTS

| | | | |
|---|---|---|---|
| 1,235,924 | 8/1917 | Read | 40—68 |
| 1,644,471 | 10/1927 | Hagerman | 40—68 |
| 1,651,033 | 11/1927 | McClellan et al. | 40—70 |
| 1,720,085 | 7/1929 | Meyers | 40—68 |
| 2,521,104 | 9/1950 | Welch | 235—110 |
| 2,874,672 | 2/1959 | Hamm | 116—133 |
| 2,945,312 | 7/1960 | Book | 40—68 |
| 3,017,087 | 1/1962 | Bodeen | 235—122 |
| 3,033,156 | 5/1962 | Verbish | 116—133 |
| 3,156,057 | 11/1964 | Cooper | 235—110 |
| 3,169,331 | 2/1965 | Herster | 40—68 |

FOREIGN PATENTS 645,639   7/1928   France.

LOUIS J. CAPOZI, *Primary Examiner.*